US006869258B2

(12) United States Patent
Flock et al.

(10) Patent No.: US 6,869,258 B2
(45) Date of Patent: Mar. 22, 2005

(54) DRILL STAND WITH SETTABLE BASE PLATE

(75) Inventors: Marcus Flock, Tholey (DE); Stefan Hammerstingl, München (DE)

(73) Assignee: Hilti Aktiengesellschaft, Schann (LI)

( * ) Notice: Subject to any disclaimer, the term of this patent is extended or adjusted under 35 U.S.C. 154(b) by 357 days.

(21) Appl. No.: 10/261,644

(22) Filed: Oct. 1, 2002

(65) Prior Publication Data

US 2003/0077133 A1 Apr. 24, 2003

(30) Foreign Application Priority Data

Oct. 2, 2001 (DE) ........................................ 101 48 809

(51) Int. Cl.[7] ................................................ B23B 45/14

(52) U.S. Cl. ............................ 408/79; 408/88; 408/98; 408/234

(58) Field of Search ............................ 408/79, 88, 95, 408/98, 234

(56) References Cited

U.S. PATENT DOCUMENTS 2,084,686 A * 6/1937 Howard ...................... 173/188
2,496,939 A * 2/1950 Gonzalez .................... 408/202
2,963,927 A * 12/1960 Hanger ........................ 408/79
3,663,115 A * 5/1972 Vindez et al. ................ 408/79
5,062,746 A * 11/1991 Deremo ....................... 408/79

FOREIGN PATENT DOCUMENTS

JP 09323317 A * 12/1997 ............ B28D/1/14

* cited by examiner

*Primary Examiner*—Daniel W. Howell
*Assistant Examiner*—J Williams
(74) *Attorney, Agent, or Firm*—Sidley Austin Brown & Wood, LLP

(57) ABSTRACT

A drill stand (1) for a manually operable tool device (2) is formed of a fixedly mountable base plate (4) having a through passageway (5) extending perpendicularly therethrough for the passage of a clamping bolt (6) having at least one axially effective stop shoulder (7*a*, 7*b*), so that at least one detent means (8) with an axially effective counter shoulder (10*a*, 10*b*) for axial form-locking engagement of the shoulder stops (7*a*, 7*b*) of the clamping bolt (6). At least one manually operable eccentric cam (11*a*, 11*b*) affords axial clamping of the clamping bolt (6) locked by the detent means (8) and arranged relative to the through passageway (5).

10 Claims, 2 Drawing Sheets

DRILL STAND WITH SETTABLE BASE PLATE

BACKGROUND OF THE INVENTION

The invention relates to a drill stand for a manually operated tool device such as a core drill device with a base or foot plate arranged to be temporarily affixed on a work piece.

Drill stands for core drills conventionally have a threaded bolt that can be temporarily fixed using a bore hole or using a base or foot plate equipped with a suction head for temporary attachment on a floor or on a wall. Such a drill stand is relatively difficult to handle during assembly due to its weight and can be fixed to a wall using a suction head only under certain conditions.

EP 894579 discloses a drill stand for a core drill having a base plate that is temporarily fixed in an elongated hole by means of a locking screw in an anchor pin. When installing the locking screw on a wall the user must hold the drill stand with the other hand and fasten it. This is unwieldy and unsafe Furthermore, the locking device as disclosed in DE 3604005 has a pivotal eccentric for an axially lockable clamping bolt that is guided in an undercut groove of a clamping bed.

SUMMARY OF THE INVENTION

The object of this invention is to provide a drill stand whose base plate can be easily and safely mounted, in particular on a wall.

Essentially a drill stand for a manually operable tool device is characterized by a base or foot plate that can be attached to a work piece, the base plate having a through passageway extending perpendicularly through it for the passage of a locking bolt having at least one stop shoulder effective in the axial direction such as, for example, a head or a thread, whereby at least one detent means having an axially effective counter shoulder is arranged for axial form-locking engagement of the locking bolt and a manually operable eccentric cam for axially locking the locking bolt using the detent means arranged at the through passageway.

After the initial preparatory step of setting a locking bolt in the surface to be worked, in a second step the drill stand situated over the locking bolt passing through the passageway in the foot plate is secured using the self-acting, for example by the action of gravity or weight, detent means engaging the locking bolt. In a third step, the drill stand is axially clamped by means of a manually operated eccentric cam via the locking bolt and is thusly normally fixed against the work surface in a frictionally immobilized manner.

Preferably, the clamping bolt has two stop shoulders that are arranged diametrically opposite each other and the detent means has two clamping jaws each with diametrically opposed counter shoulders, wherein locking is effected symmetrically and exclusively respective of forces relative to the locking bolt.

The two clamping jaws of the detent means are spring biased towards the locking bolt, whereby, independently of the position in space of the drill stand, automatic locking of the detent means occurs.

Advantageously, an opening wedge is arranged in the detent means and is axially displaceable by the eccentric cam and the base plate, which, when the displaceable detent means is moved opposite to the locking direction, effects a radial opening of the two clamping jaws of the detent means, whereby the released locking bolt is easily removed from the locked state.

Preferably, the axially acting stop shoulder of the locking bolt is formed as part of an external thread or of an axially symmetrical detent, wherein a plurality of discretely equidistantly arranged locking positions are present and thus the tolerance of the setting height of the locking bolt relative to the clamping length of the eccentric cam is substantially greater.

Advantageously, the axially effective stop shoulder of the clamping bolt is axially undercut and has a pine-tree shaped catch arrangement, wherein the radial positioning of the locked counter-shoulder of the detent means is secured directly by the axial locking means and any additional securing means in this respect can be dispensed with.

Preferably, the passageway hole is shaped as an elongated passageway, relative to which the detent means extends in the same direction and also radially relative to the clamping bolt, whereby the possibility of adjustment of the drill stand with respect to the clamping bolt is created.

Advantageously, the detent means has at both ends of the elongated passageway a manually operated eccentric cam for axial clamping along the length of the passageway, and further is optionally connected with each other by a moveable connection means and thus both can be operated manually.

Advantageously, the manually operable eccentric cam is connected with a manual pivot lever that can be pivoted to a limited extent, whereby ergonomic locking is provided.

BRIEF DESCRIPTION OF THE DRAWING

The invention is more completely described using an exemplary embodiment, wherein.

DETAILED DESCRIPTION OF THE INVENTION

Figure 1:
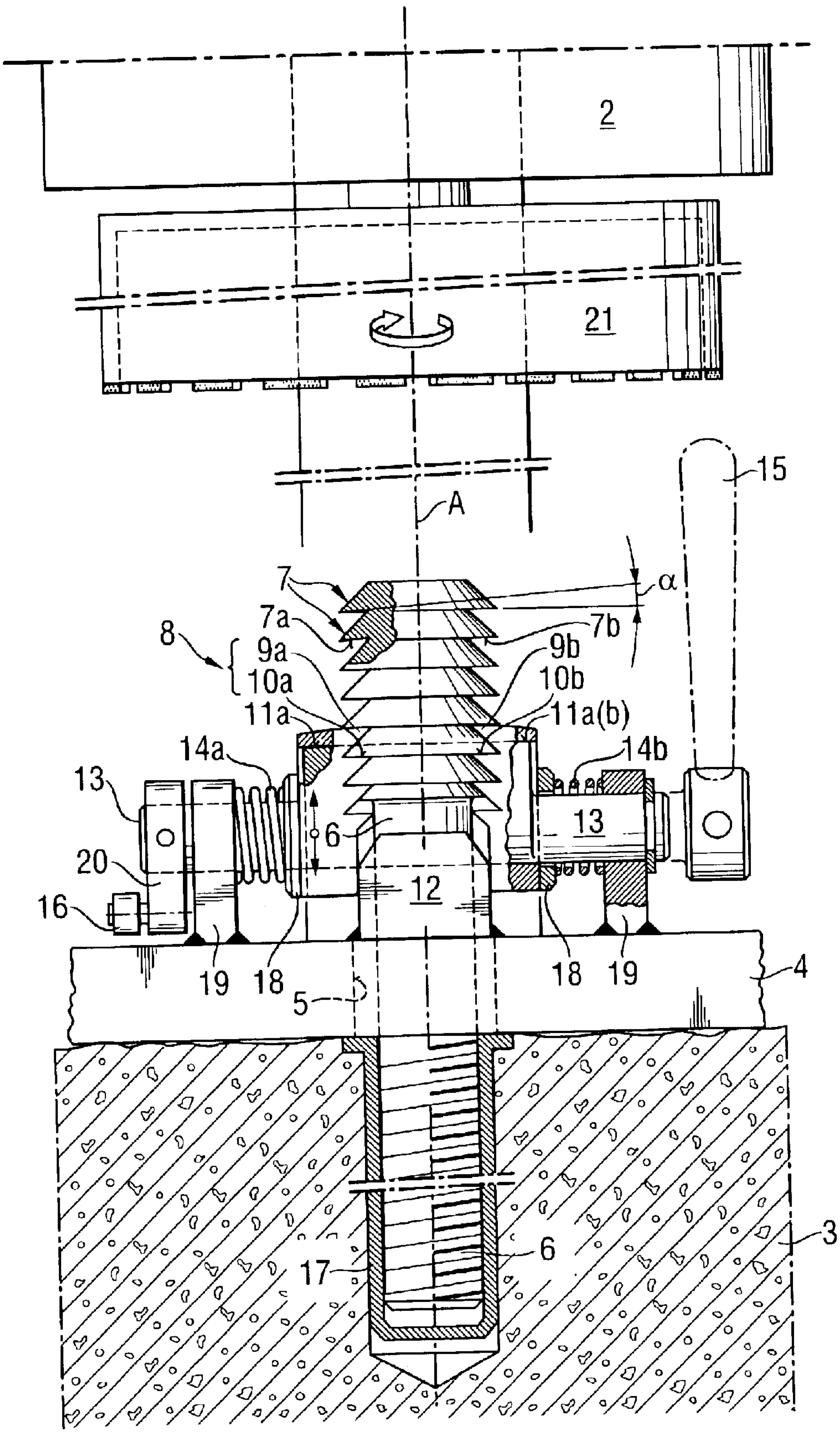
FIG. 1 is an elevation view of a drill stand with a base plate mounted in a fixed position.

According to FIG. 1, a drill stand 1, for a core drill device comprised of a drilling tool 2 mounting a crown core bit 21, has a base plate 4 positioned on a work piece 3 (represented as a generally flat surface) having a passageway 5 running perpendicularly through the base plate 4 and having a clamping bolt 6, extending therethrough and anchored temporarily in the work piece with an anchor pin 17. The clamping bolt 6 has axially effective stop shoulders 7*a*, 7*b* diametrically arranged opposite to each other spaced along an axis A and formed as part of an axially symmetrical pine-tree shaped catch means, discretely equidistantly axially arranged and having an axial undercut angle $\alpha$. Associated with the passageway 5, there is a detent means 8 comprised of two diametrically opposed clamping jaws 9*a*, 9*b* each with a axially acting counter shoulder 10*a*, 10*b* and two spaced eccentric cams 11*a*, 11*b* acting as pivot bearings for the clamping jaws 9*a*, 9*b* for the axial locking of the clamping bolt 6 by the detent means 8. An opening wedge 12 is arranged on the base plate 4 between the detent means 8 and is axially displaceable by the eccentrics cams 11*a*, 11*b* and the base plate 4. The eccentrics cams 11*a*, 11*b* connected by means of a limitedly pivotal shaft 13 for the clamping jaws 9*a*, 9*b*, biased by means of springs 14*a*, 14*b* and shims or washers 18 relative to the clamping bolt 6 and can be operated by means of a manually actuated pivot lever 15 associated with one of the eccentric cams 11*b*.

Figure 2:
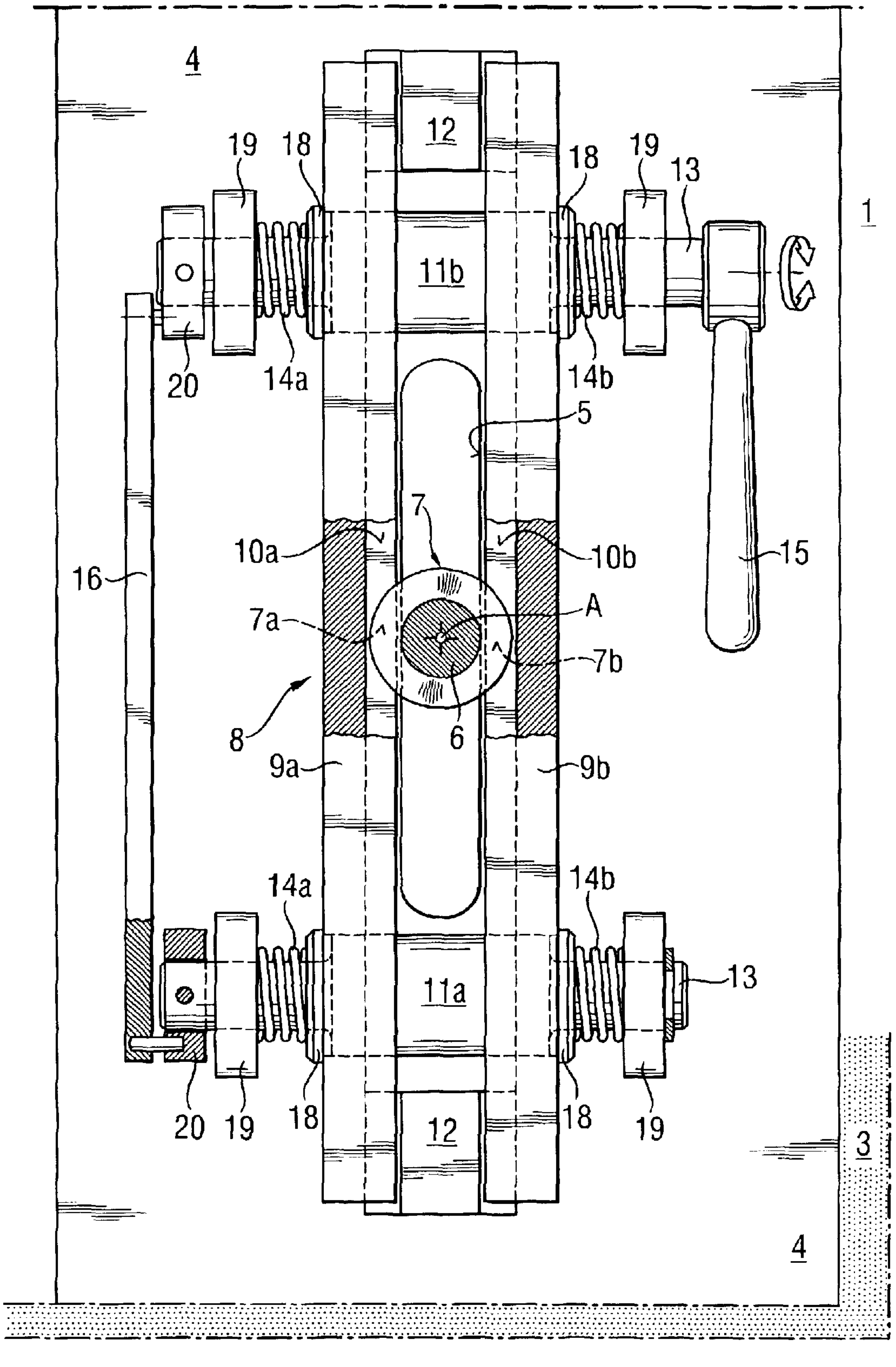
FIG. 2 is a plan view of the base plate.

According to FIG. 2, the passageway 5 is a elongated hole in the base plate 4 relative to which the detent means 8 runs both in the elongated direction and radially relative to the clamping bolt 6. The detent means 8 exhibits at both ends of the longitudinal hole the opening wedge 12 under the shaft 13 arranged in the blocks 19 and for each of the eccentric cams 11*a*, 11*b* and springs 14*a*, 14*b* and washers or shims 18 for each detent jaw 9*a*, 9*b*, which are pivotal to a limited extent and connected with each other via a moveable connection means 16 and cranks 20 via the shafts 13 and are both manually operable using the manual pivot lever 15.

What is claimed is:

1. A drill stand for a manually operated tool device (2) comprises a base plate (4) arranged to be fixedly mounted on a work piece and having a first surface facing the workpiece and an oppositely facing second surface, said base plate (4) has a through passageway (5) extending between and perpendicular to said first and second surfaces, an clamping bolt (6) with an axis (A) arranged to extend through said passageway (5) into the workpiece and having at least one stop shoulder (7*a*, 7*b*) thereon spaced axially from said base plate (4), at least one detent means (8) with a counter shoulder (10*a*, 10*b*) thereon for axial form locking engagement of said stop shoulder (7*a*, 7*b*) on said clamping bolt (6), and at least one manually operable eccentric cam (11*a*, 11*b*) mounted on said base plate and spaced from said clamping bolt (6) for clamping said clamping bolt (6) in locked engagement of said detent means (8) relative to said through passageway (5).

2. A drill stand, as set forth in claim 1, wherein said clamping bolt (6) has a pair of diametrically opposite stop shoulder (7*a*, 7*b*) and said detent means (8) has two oppositely spaced clamping jaws (9*a*, 9*b*) each with one of said counter shoulders (10*a*, 10*b*) for locking engagement with said stop shoulders (7*a*, 7*b*).

3. A drill stand, as set forth in claim 2, wherein said clamping jaws (9*a*, 9*b*) of said detent means are spring biased relative to the axis (A) of such clamping bolt (6).

4. A drill stand, as set forth in claim 3, wherein an opening wedge (12) is positioned relative to said detent means (8) displaceable by said eccentive cams (11*a*, 11*b*) and said base plate (4) whereby said opening wedge (12) effects a widening of the space between said clamping jaws (9*a*, 9*b*) of said detent means (8) when said detent means are displaced opposite to the clamping direction.

5. A drill stand, as set forth in claim 1, wherein said stop shoulders (7*a*, 7*b*) of said clamping bolt (6) have undercuts in the axial direction.

6. A drill stand, as set forth in claim 1, wherein said stop shoulder (7*a*, 7*b*) of said clamping bolt (6) are formed as one of part of an external thread and an axially symmetrical catch means.

7. A drill stand, as set forth in claim 1, wherein said through passageway (5) is shaped as an elongated hole extending transversely outwardly from the axis (A) of said clamping bolt (6) and said detent means (8) extends in the same direction and radially outwardly from said clamping bolt (6).

8. A drill stand, as set forth in claim 7, wherein said detent means (8) spaced outwardly from each end of said through passageway has one of said eccentric cams (11*a*, 11*b*).

9. A drill stand, as set forth in claim 8, wherein a moveable connection means (16) mounted on said base plate (4) is connected to said eccentric cams (11*a*, 11*b*).

10. A drill stand, as set forth in claim 9, wherein a manually operable pivot lever (15) is connected to one of said eccentric cams (11*a*, 11*b*) and operates the other said eccentric cam via said connection means (16).

* * * * *